United States Patent [19]
Hollier et al.

[11] Patent Number: 6,035,270
[45] Date of Patent: *Mar. 7, 2000

[54] TRAINED ARTIFICIAL NEURAL NETWORKS USING AN IMPERFECT VOCAL TRACT MODEL FOR ASSESSMENT OF SPEECH SIGNAL QUALITY

[75] Inventors: Michael P Hollier, Ipswich; Philip J Sheppard, London; Philip Gray, Ipswich, all of United Kingdom

[73] Assignee: British Telecommunications public limited company, London, United Kingdom

[ * ] Notice: This patent is subject to a terminal disclaimer.

[21] Appl. No.: 09/000,270
[22] PCT Filed: Jul. 25, 1996
[86] PCT No.: PCT/GB96/01821
   § 371 Date: Feb. 3, 1998
   § 102(e) Date: Feb. 3, 1998
[87] PCT Pub. No.: WO97/05730
   PCT Pub. Date: Feb. 13, 1997

[30] Foreign Application Priority Data

Jul. 27, 1995 [EP] European Pat. Off. ............... 95305313
Feb. 29, 1996 [EP] European Pat. Off. ............... 96301393
Feb. 29, 1996 [GB] United Kingdom ................... 9604315

[51] Int. Cl.[7] .............................. H04M 3/22; H04B 3/46; G01L 9/18
[52] U.S. Cl. .............................. 704/202; 704/228; 706/20
[58] Field of Search ................................... 704/202, 228; 706/20, 21

[56] References Cited

U.S. PATENT DOCUMENTS 5,715,372 2/1998 Meyers et al. .............................. 706/16
5,799,133 8/1998 Hollier et al. .............................. 706/25
5,867,813 2/1999 Pietro et al. .............................. 704/202

OTHER PUBLICATIONS

IEEE International Conference on Communications 87 –Session 33.3, vol. 2, Jun. 7–10, 1987, Seattle (US), pp. 1164–1171, Edmund A. Quincy, "Prolog Based Expert Pattern Recognition System Shell for Technology . . .".

Patent Abstracts of Japan vol. 17, No. 202 (E–2353), Apr. 20, 1993 & JP,A, 04 345327 (Nippon Telegr & Teleph Corp), Dec. 1, 1992.

IEEE Pacific RIM Conference on Communications, Computers and Signal Prooccessing, Jun. 1–2, 1989, Victoria (CA), pp. 208–211, R.F. Kubichek et al, "Speech Quality Assessment Using Expert Pattern Recognition Techniques".

K. K. Paliwal and B. S. Atal, "Efficient Vector Quantization of LPC Parameters at 24 Bits/Frame," Proc. IEEE ICASSP, pp. 661–664, Apr. 1991.

*Primary Examiner*—David R. Hudspeth
*Assistant Examiner*—Tãlivadis Ivars Šmits
*Attorney, Agent, or Firm*—Nixon & Vanderhye P.C.

[57] ABSTRACT

A speech signal is subjected imperfect to vocal tract analysis model and the output therefrom is analyzed by a neural network. The output from the neural network is compared with the parameters stored in the network definition function, to derive measurement of the quality of the speech signal supplied to the source. The network definition function is determined by applying to the trainable processing apparatus a distortion perception measure indicative of the extent to which a distortion would be perceptible to a human listener.

25 Claims, 5 Drawing Sheets

TRAINED ARTIFICIAL NEURAL NETWORKS USING AN IMPERFECT VOCAL TRACT MODEL FOR ASSESSMENT OF SPEECH SIGNAL QUALITY

BACKGROUND OF THE INVENTION

1. Field of the Invention

This invention relates to the assessment of an audio signal carrying speech. It is of particular application to the assessment of the condition of telecommunications systems whilst in use.

2. Related Art

Signals carried over telecommunications links can undergo considerable transformations. such as digitisation, data compression, data reduction, amplification, and so on. All of these processes can distort the signals. For example. in digitising a waveform whose amplitude is greater than the maximum digitisation value, the peaks of the waveform will be converted to a flat-topped form (a process known as peak clipping). This adds unwanted harmonics to the signal. Distortions can also be caused by electromagnetic interference from external sources.

The distortions introduced by the processes described above are non-linear, so that a simple test signal may not be distorted in the same way as a complex waveform such as speech, or at all. For a telecommunications link carrying data it is possible to test the link using all possible data characters (e.g. the two characters 1 and 0 for a binary link, or the twelve tone-pairs used in DTMF (dual tone multi-frequency) systems. However speech does not consist of a limited number of well-defined signal elements, but is a continuously varying signal, whose elements vary according to not only the content of the speech (and the language used) but also the physiological and psychological characteristics of the individual speaker, which affect characteristics such as pitch, volume, characteristic vowel sounds etc.

It is known to test telecommunications equipment by running test sequences using samples of speech. Comparison between the test sequence as modified by the equipment under test and the original test sequence can be used to identify distortion introduced by the equipment under test. For example, Edmund Quincy, in the IEEE International Conference on Communications 87; Session 33.3; vol 2 (pages 1164–1171) describes such a method of analysing such a signalm using a "rule-based" system (also known as an "expert" system), in which predetermined objective rules are used to generate, for a given input signal, an appropriate output indicative of the quality of the signal.

The arrangement described above requires the use of a pre-arranged test sequence, which means it cannot be used on a live telecommunications link—that is, a link currently in use for revenue-earning traffic—because the test sequence would interfere with the traffic being carried and be audible to the users, and because conversely the live traffic itself (whose content cannot be predetermined) would be detected by the test equipment as distortion of the test signal.

In order to carry out tests on equipment in use, without interfering with the signals being carried by the equipment (so-called non-intrusive testing), it is desirable to carry out the tests using the live speech signals themselves as the test signals. However, a problem with using live speech as the zest signal is that there is no instantaneous way of obtaining, at the point of measurement, a sample of the original signal. Any means by which the original signal might be transmitted to the measurement location would be likely to be subject to similar distortions as the link under test.

The present Applicant's co-pending International Patent applications WO96/06495 and WO96/06496 (both published on 29th February 1996, and U.S. Pat. No. 5,940,792) propose two possible solutions to this problem. WO96/06495 (now also U.S. application Ser. No. 08/765,697) describes the analysis of certain characteristics of speech which are talker-independent in order to determine how the signal has been modified by the telecommunications link. It also describes the analysis of certain characteristics of speech which vary in relation to other characteristics, not themselves directly measurable, in a way which is consistent between individual talkers, and which may therefore be used to derive information about these other characteristics. For example, the spectral content of an unvoiced fricative varies with volume (amplitude), but in a manner which is largely independent of the individual talker. The spectral content can thus be used to estimate the original signal amplitude, which can be compared with the received signal amplitude to estimate the attenuation between the talker and the measurement point.

In WO96/06496, the content of a received signal is analysed by a speech recogniser and the results of this analysis are processed by a speech synthesiser to regenerate a speech signal having no distortions. The signal is normalised in pitch and duration to generate an estimate of the original speech signal which can be compared with the received speech signal to identify any distortions or interference, e.g. using perceptual analysis techniques as described in International Patent Applications WO94/00922 and WO95/15035 (issued as U.S. Pat. Nos. 5,621,854 and 5,794,188, respectively).

Typically speech transmission over a limited bandwidth employs data reduction. Linear predictive codecs (LPCs) are based on an approximation to the human vocal tract and represent segments of speech waveform as the parameters required to excite equivalent behaviour in a "vocal tract model". For many applications the speech content of a signal can be analysed by identifying parameters of the speech In such a vocal tract model. However. such models cannot model elements which were not generated in the vocal tract. Consequently. conventional vocal tract models cannot readily analyse distortions.

SUMMARY OF THE INVENTION

According to a first aspect of the present invention, there is a provided a method of assessing the quality of a signal carrying speech, in which the signal is analysed to generate output parameters according to a spectral representation model capable of generating coefficients that can parametrically represent both the speech and the distortion signal elements, and the output parameters are weighted according to a predetermined network definition function to generate an output derived from the weighted output parameters.

According to a second aspect of the invention, there is provided apparatus for assessing the quality of a signal carrying speech, comprising means for analysing the signal using a spectral representation capable of generating coefficients that can parametrically represent both the speech and the distortion signal elements to generate output parameters, storage means for storing a set of weightings defining a network definition function, and means for generating an output value derived from the output parameters and the network definition function.

Preferably the network definition function is derived in a preliminary step from data for which the output value is known. Because a network definition function can be derived automatically, using known data, the system can produce outputs according to much more complex functions than can an "expert" system, and without any prior assumptions about the physiological processes taking place in the human auditory system.

The spectral representation model defined above will be referred to in the following description as an 'imperfect vocal tract model', which in this context means a vocal tract model which is not 'ideal' but is also capable of generating coefficients relating to auditory spectral elements that the human vocal tract is incapable of producing, which is not the normal goal for vocal tract model design. In a preferred embodiment, the network definition function is generated by using speech samples having known properties, e.g. well-conditioned or deliberately ill-conditioned, which are analysed by the vocal tract model, and the parameters generated can then be identified as relating to well or ill-conditioned signals, by a trainable process such as a neural network. In this way weightings can be built up for vocal tract parameters associated with each type of signal, so that when an unknown signal is processed an output can be generated using the previously generated weightings associated with those parameters which relate to the unknown signal.

Preferably the network definition function weightings are dependant on the temporal context of the output parameters. To this end, sequences of parameters, as well as individual parameters, may be given weightings. A sequence of parameters of successive time frames should follow one of a number of recognised sequences corresponding to real speech sounds. Should a set of parameters be identified for a time frame which should not follow the previous members of the sequence, or which should not appear at all, this indicates that a distortion is present.

In one embodiment, the apparatus may further comprise training means for generating the stored set of weightings, the training means comprising first input means for supplying a sample of speech to the modelling means; second input means for supplying to the training means known output information (referred to hereinafter as "labels") relating to the speech sample; means for generating weightings from the modelling means based on the labels, and storage means for storing weightings generated by the modelling means.

The speech segments used in the training sample must therefore each be labelled as well-conditioned ("good") or ill-conditioned ("poor"). This is a major undertaking, because a typical sample comprises several hours of speech, and many such samples are required in order to train the system to respond correctly to a range of talkers, conditions, and other variables. The duration of an individual segment is typically 20 milliseconds, so in all several million segments must be labelled.

Accordingly, in a preferred embodiment, the training means comprises means for providing a training sequence comprising a first signal and a distorted version of the first signal, analysis means for receiving the training sequence and generating a distortion perception measure for indicating the extent to which the distortion would be perceptible to a human listener, and means for applying the distortion perception measure to the trainable processing apparatus to determine the network definition function.

Preferably the trainable process comprises the steps of providing a training sequence comprising a first signal and a distorted version of the first signal, and determining the network definition function by the measuring the perceptual degree of distortion present in each segment, as determined by an analysis process comprising generating a distortion perception measure which indicates the extent To which the distortion of said signal will be perceptible to a human listener.

In a preferred arrangement the analysis process estimates the effect which would be produced on the human auditory system by distorted and undistorted versions of the same signal, and determines the differences between the said effects, and generates said distortion perception measure in dependence upon said difference. Preferably, the analysis process generates said distortion perception measure to depend upon the perceptual intensity of said distortion, and to depend nonlinearly upon the amplitude of said distortion.

The analysis process preferably generates a plurality of spectral component signals of said test signal and/or said distorted signal, and estimates, for each spectral component signal, the masking effect which that spectral component signal would produce on the human auditory system.

In a preferred arrangement the analysis process estimates the effect which said distortion would produce on the human auditory system by decomposing the distorted signal into a plurality of spectral component bands, the spectral component bands being shaped to provide spectral masking; calculating the temporal masking of the signal due to preceding and/or succeeding temporal portions thereof; forming, for each of the spectral component signals, a representation of the difference between the component signal of the distorted signal and a correspondingly calculated component of the test signal; and generating said distortion perception measure from said difference measure. In a particularly preferred arrangement the analysis process generates a measure of the spectral and temporal distribution of the distortion from said difference signal.

Each training sequence will typically be a large corpus of natural speech, in order to account for the variations in characteristics between different talkers. In the preferred embodiment the analysis process comprises the steps of decomposing the distorted speech signal into a plurality of spectral component bands, the spectral component bands being shaped to provide spectral masking; calculating the temporal masking of the signal due to preceding and/or succeeding temporal portions thereof; forming, for each of the spectral component signals, a representation of the difference between the component signal of the distorted signal and a correspondingly calculated component of the test signal; and generating said distortion perception measure from said difference measure.

Suitable speech analysis processes are described in International patent Applications WO94/00922, WO95/01011 (U.S. Pat. No. 5,890,104 and allowed application Ser. No. 09/100,470) and WO95/15035. By labelling the segments automatically, using a distortion perception measure, the network definition function can be derived consistently but nevertheless according to factors perceptible to a human listener.

BRIEF DESCRIPTION OF THE DRAWINGS

An exemplary embodiment of the invention will now be described, with reference to the accompanying drawings which show the functional relationship of the various elements of the embodiment. It will be appreciated that the invention can be embodied advantageously in software to run on a general purpose computer.

DETAILED DESCRIPTION OF EXEMPLARY EMBODIMENTS

Figure 1:
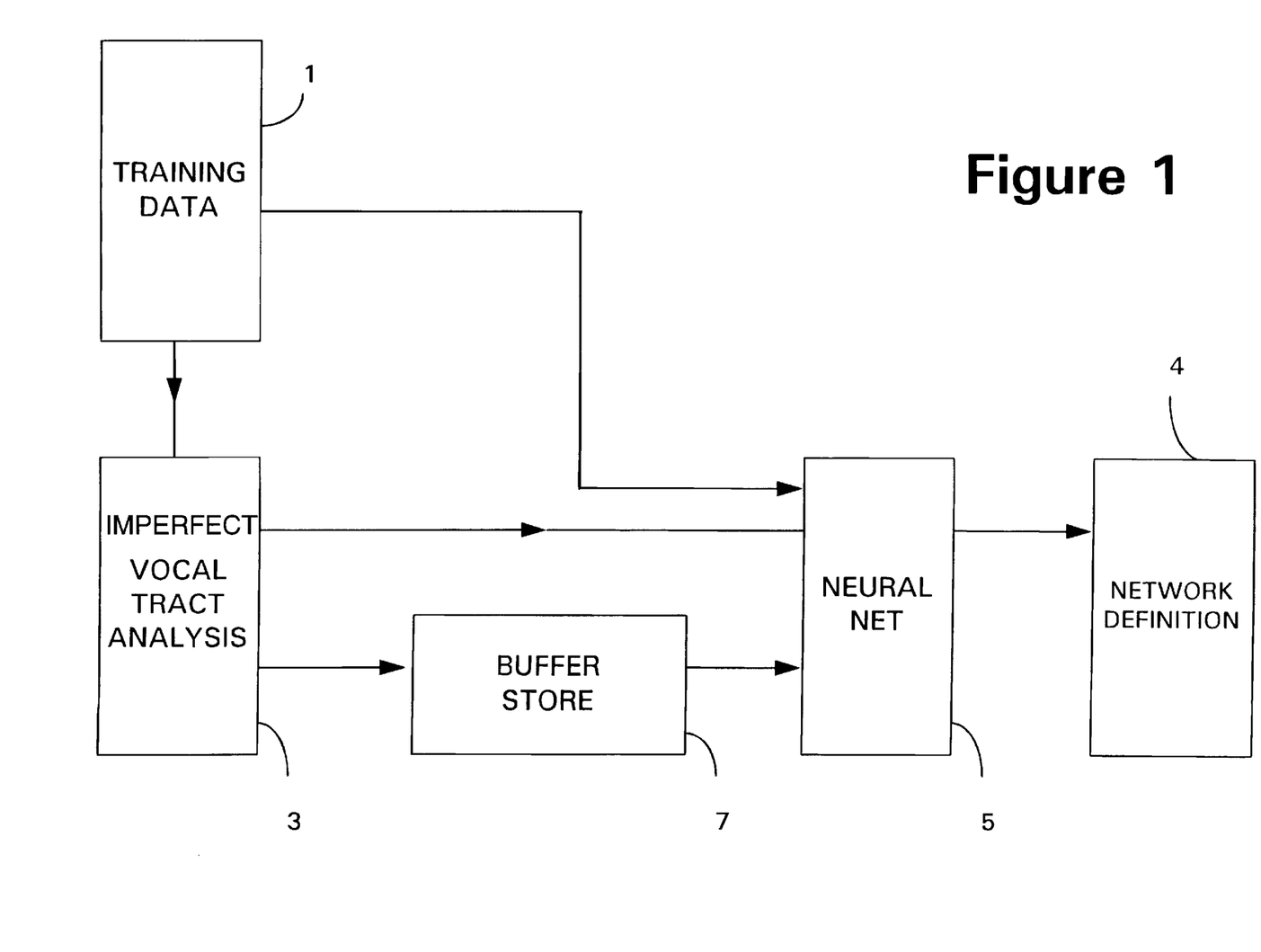
FIG. 1 shows the functional elements of a trainable system configured for a training process.
Figure 2:
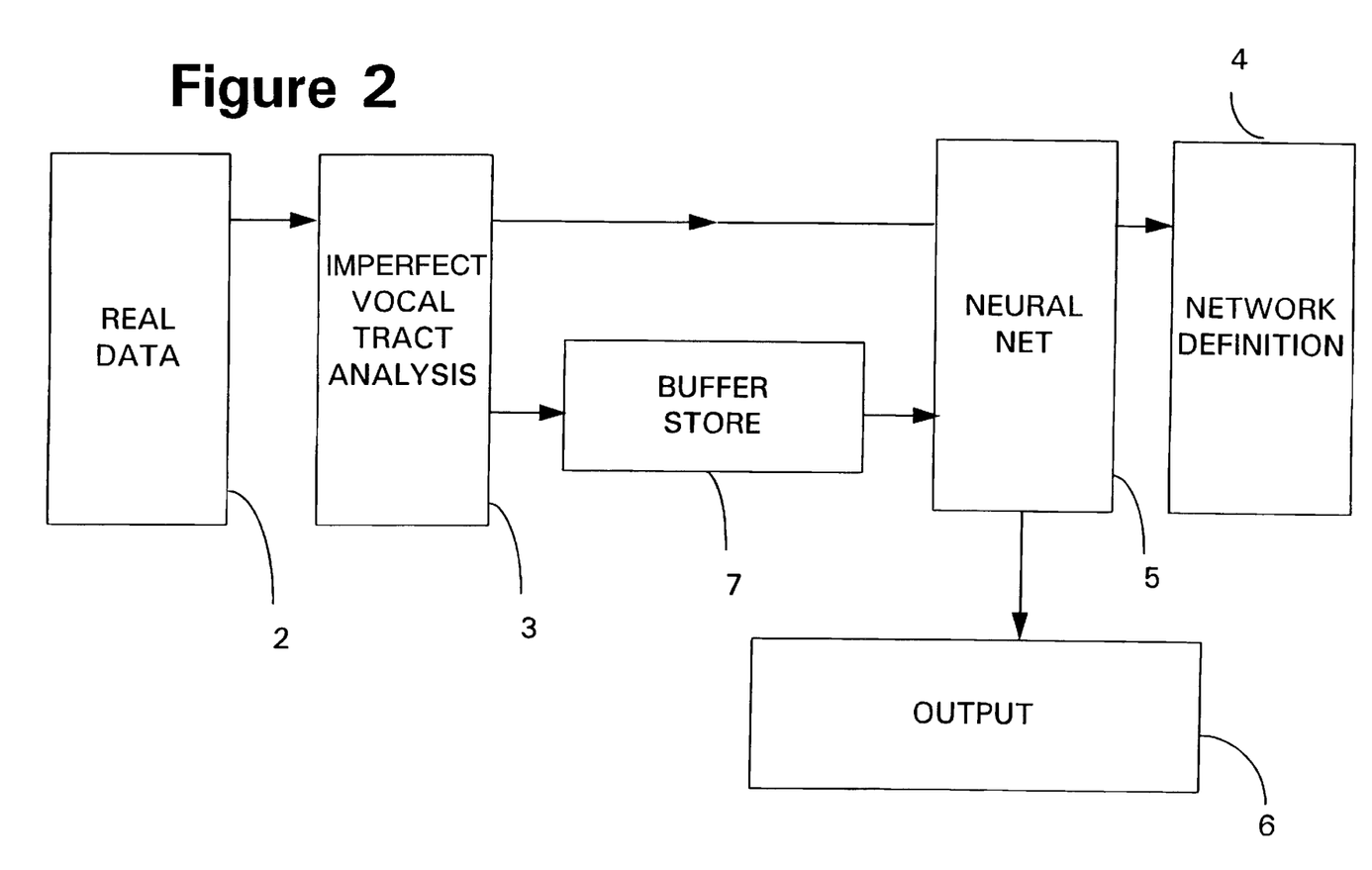
FIG. 2 shows the functional elements of the same system configured for a run with unknown data.

The system of FIGS. 1 and 2 comprises a source of training data 1 and a source of live traffic (real data) 2 both of which provide inputs to a vocal tract analyser 3. Parameters associated with the training data are also supplied from the training apparatus 1 to a classification unit 5, which is shown as a trainable process, specifically a neural network 5. Parameters output by the analyser unit 3 are fed to the neural network 5. During the training process the neural network 5 provides parameters to a store 4. These parameters define a network definition function. When real data are read, the parameters are retrieved from the store 4 and used by the neural network 5 to perform the network definition function on the values generated by the vocal tract analyser 3 to generate classification data which are supplied to an output 6. Typically the output data are in the form of a classification based on the values generated by the analyser 3, weighted according to the network definition function, and indicating the degree of distortion identified by the system. For example, a signal may be classified as 'good' if all weighted parameters exceed a predetermined value, and/or if some arithmetical combination of the weighted parameters (e.g. their total sum) exceeds a predetermined value. Some measurable properties have characteristic values which are predictable from the measurement of one or more others. If the value actually measured does not correspond to the predicted value, then one or other of the values has been distorted, thereby giving another indication of the quality of the signal. Several quality levels may be defined, by setting a number of thresholds.

For practical purposes the signal is analysed as a sequence of time frames. Parameters derived from data relating to a first time frame may be used in analysis of subsequent time frames. For this purpose the output of the vocal tract analysis 3 is stored in a buffer store 7 for later use in subsequent operations of the neural network 5.

Figure 3:
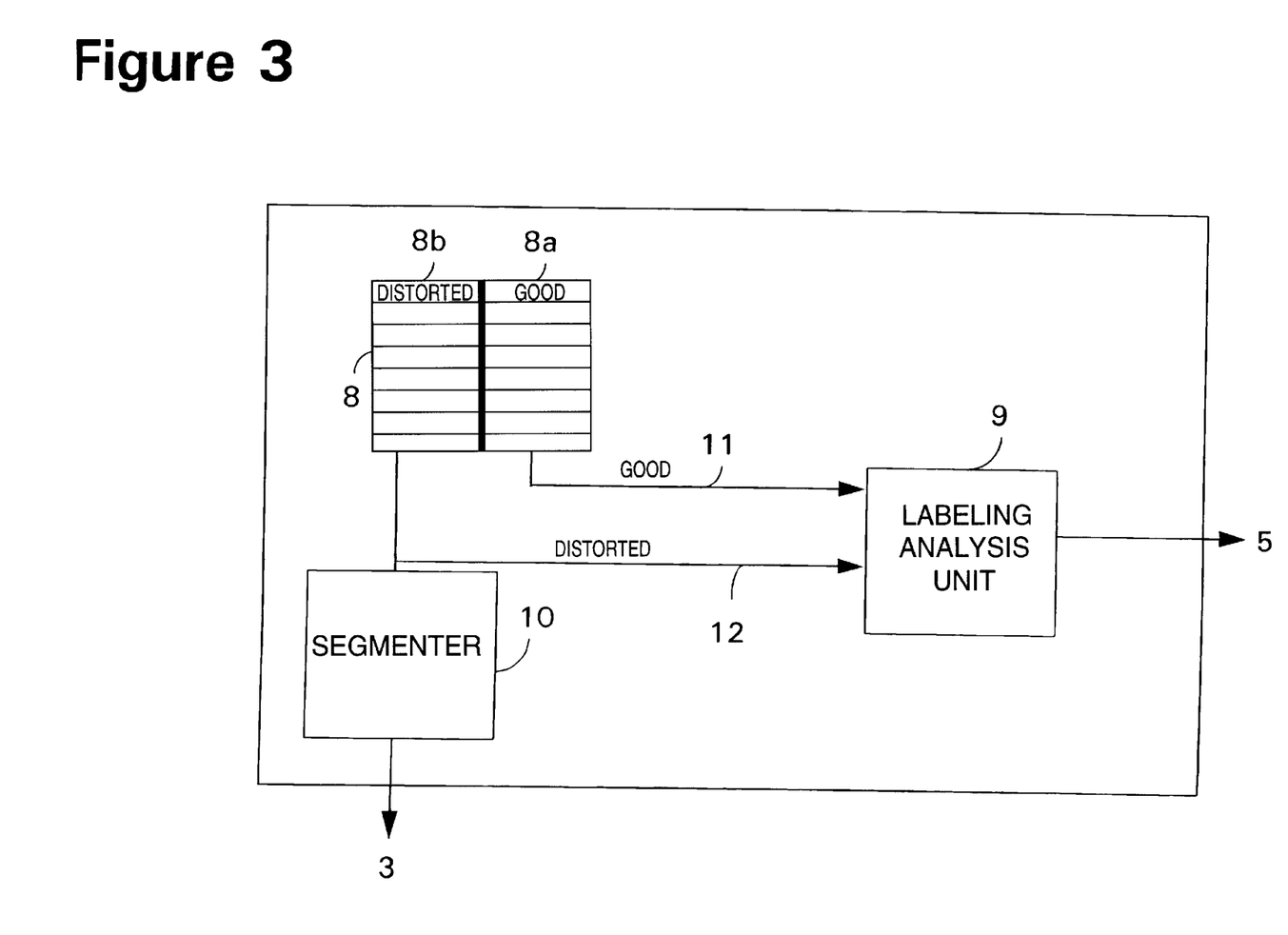
FIG. 3 shows the training apparatus of FIG. 1 in greater detail.

FIG. 3 shows the training apparatus 1 in greater detail. It includes a data store 8, comprising a first store 8a of 'good' signals and a second store 8b having distorted versions of the good signals stored in the first store 8a. The good signal from the store 8a, and its corresponding distorted version from the store 8b, are fed through respective first and second inputs 11, 12 to an analysis unit 9 which provides an output comprising a sequence of labels which are then transmitted to the neural net 5 (FIG. 1). The distorted version of the signal is also sent to a segmenter 10, which divides the signal into individual segments corresponding to the labels. These segments are then transmitted to the vocal tract analyser 3. (FIG. 1).

Figure 4:
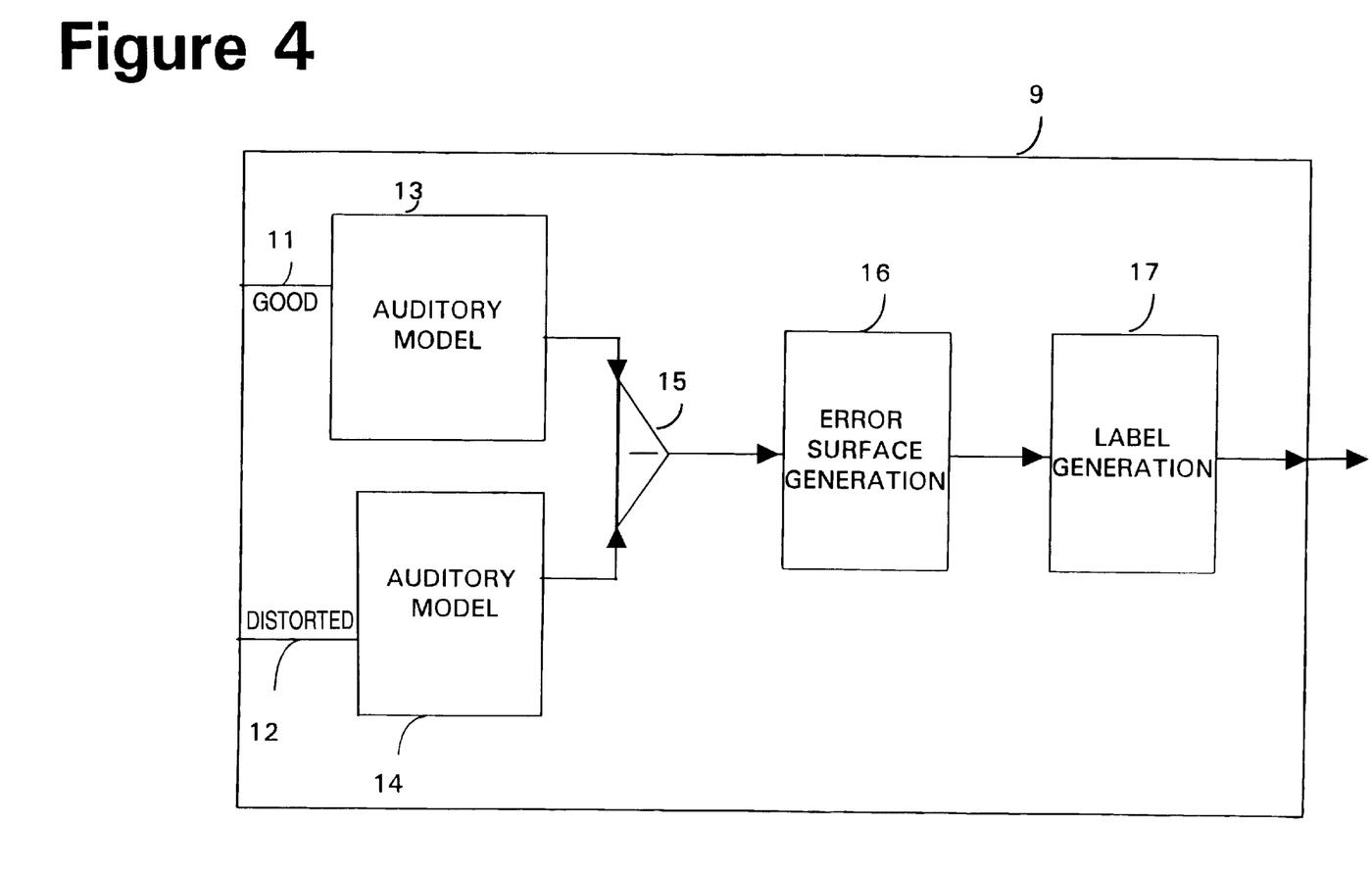
FIG. 4 shows the analysis apparatus of FIG. 3 in greater detail.

FIG. 4 shows the analysis unit 9 in greater detail. The inputs 11 and 12 from the first and second stores (8a, 8b) carrying the "good" signal and the distorted versions of the good signal are each fed through an auditory model (respectively 13, 14) and the outputs of the auditory models are compared in a comparator 15. It will be apparent to the skilled reader that in an alternative arrangement corresponding passages of the good and distorted signal may be fed alternately through the same auditory model and the outputs of this auditory model compared for the good and distorted signal passages. The output from the comparator 15 is used to generate an error surface in error surface generator 16, and the properties of the error surface so generated are used to derive labels in a label generator 17 appropriate to the characteristics of the error surface 16. These labels are produced in synchronism with the segmentation of the signal in the segmenter 10. The labels are output to the neural net 5 (FIG. 1).

Figure 5:
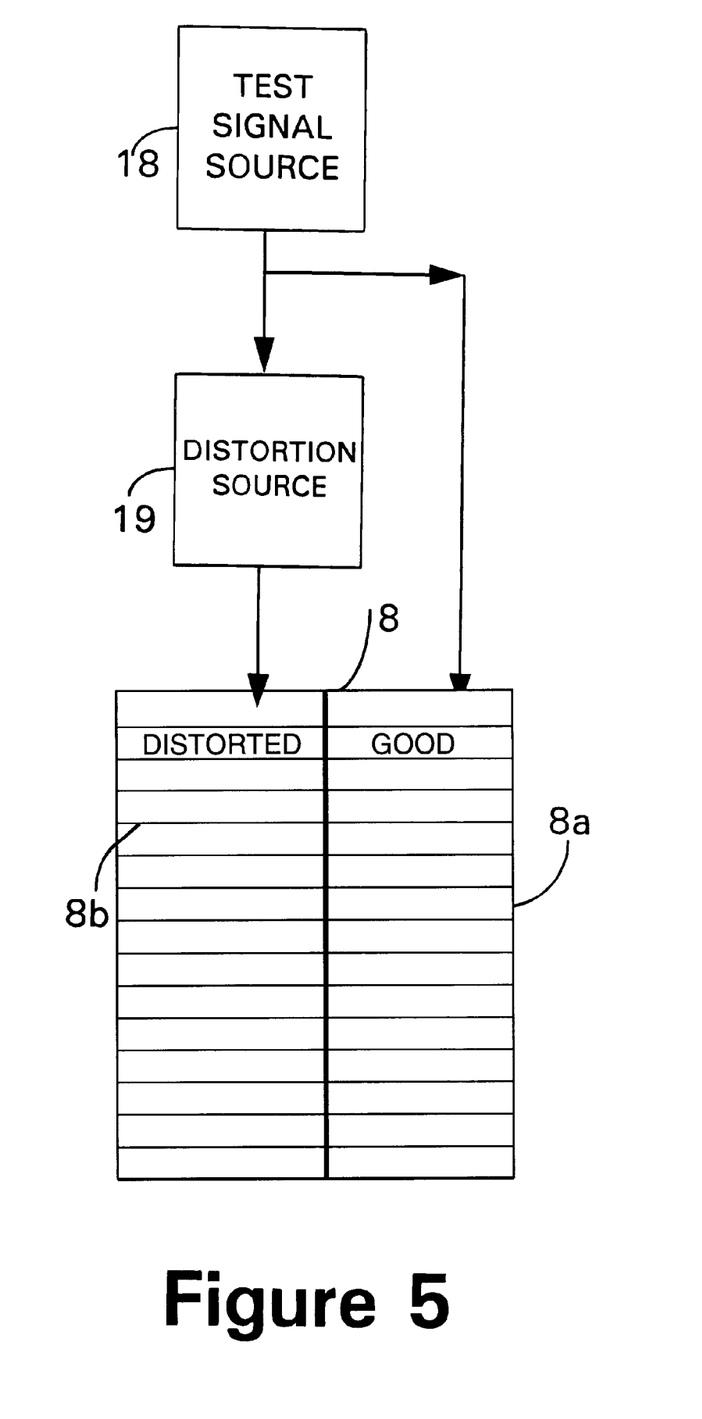
FIG. 5 shows an apparatus by which the initial speech samples supplied by the data source may be generated.

FIG. 5 shows the generation of the data for the data store 8. An original test signal 18 is generated by any suitable means, as will be described later, and transmitted directly to the first store 8a. The same signal is also transmitted through a distorting means 19 and the resulting distorted signal is stored in a second store 8b.

It is appropriate here to briefly discuss the characteristics of vocal tract analysis systems and trainable processes. The vocal tract is a non-uniform acoustic tube which extends from the glottis to the lips and varies in shape as a function of time [Fant G C M, "Acoustic Theory of Speech Production", Mouton and Co., 's-gravehage, the Netherlands, 1960]. The major anatomical components causing the time varying change are the lips, jaws, tongue and velum. For ease of computation it is desirable that models for this system are both linear and time-invariant. Unfortunately, the human speech mechanism does not precisely satisfy either of these properties. Speech is a continually time varying-process. In addition, the glottis is not uncoupled from the vocal tract, which results in non-linear characteristics [Flanagan J L "Source-System Interactions in the Vocal Tract", Ann. New York Acad. Sci 155, 9–15, 1968]. However, by making reasonable assumptions, it is possible to develop linear time invariant models over short intervals of time for describing speech events [Markel J D, Gray A H, "Linear Prediction of Speech", Springer-Verlag Berlin Heidelberg New York, 1976]. Linear predictive codecs divide speech events into short time periods, or frames, and use past speech frames to generate a unique set of predictor parameters to represent the speech in a current frame [Atal B S, Hanauer S L "Speech Analysis and Synthesis by Linear Prediction of the Speech Wave" J. Acoust. Soc. Amer., vol. 50, pp. 637–655, 1971]. Linear predictive analysis has become a widely used method for estimating such speech parameters as pitch, formants and spectra. Auditory models (time/frequency/amplitude spectrograms) rely on audible features of the sound being monitored, and take no account of how they are produced, whereas a vocal tract model is capable of identifying whether the signal is speech-like, i.e. whether a real vocal tract could have produced it. Thus inaudible differences, not recognised by auditory models, will nevertheless be recognised by a vocal tract model.

For the purpose of measuring signal quality, the output parameters generated must be sensitive to the property being measured, i.e. the perceived speech quality. The model must therefore be capable of modelling distortion which is not speech-like, and therefore an ideal vocal tract model would not be suitable. An ideal model would convert all input signals into speech-like forms (not necessarily the original ones if the distortion is severe). This would make the classification process unreliable, as the distorted inputs and pure inputs would both be classified as speech-like, rendering the training process impossible. It is therefore important that the vocal tract model is 'imperfect', in the sense previously defined, since the process relies on the output parameters from the vocal tract model being sensitive to the presence of non-human distortion elements in order to distinguish between ill-conditioned and well-conditioned signals. A vocal tract model suitable for use as the analyser 3 is the Linear Predictive Coding model as described in "Digital Processing of Speech Signals": Rabiner L. R.; Schafer R. W; (Prentice-Hall 1978) page 396.

Spectral analysis may be used as an alternative to a vocal tract model, for example "one-third octave analysis" as discussed in Section 3.6 of "Frequency Analysis" by R. B. Randall, (published by Bruel & Kjaer, 1987 (ISBN 87 87355 07 8).

The characteristics of trainable processes, and particularly neural nets, will now be discussed. In order to map a number of inputs onto a smaller number of predetermined results classes it is possible to use a series of rules, particularly if the mapping process represents a natural system. However, if the natural system is too complex, or the required mapping operates on abstract parameters, then a trainable process can be used to develop the required mapping in response to a series of known results, referred to as the training data. The known results are used to determine the relationship between the input parameters and the results classes such that subsequent unknown combinations of inputs can be classified. A neural network is designed to model the way in which the brain performs a particular task or function of interest. It is possible to train a neural network to perform useful computations through a process of learning [Haykin S, "Neural Networks, A Comprehensive Foundation", Macmillan IEEE Press, 1994]. To achieve good performance neural networks employ a massive interconnection of simple processing units. Interprocessing unit connection strengths, known as weights, are used to store the knowledge of the system. [Aleksander I, Morton H "An Introduction of Neural Computing" Chapman and Hall London, 1990]. The procedure used to perform the learning process is called the learning algorithm, the function of which is to modify the weights of the network in an orderly fashion so as to attain a desired design objective. The power of a neural network is derived from a massively parallel distributed structure and its ability to learn and therefore generalise; generalisation refers to the network producing reasonable outputs for inputs not encountered during training. Supervised learning is a form of training which involves presenting known examples of classes to the network and then modifying the interconnecting weights in order to minimise the difference between the desired and actual response of the system. The training is repeated for many examples from each of the classes of inputs until the network reaches a steady state. There is a close analogy between the input-output mapping performed by a neural network and the classification achieved by non-parametric statistical inference.

The operation of the system will now be described. Referring first to FIG. 2, real data can be supplied from the source 2 to the vocal tract analysis system 3. Distortion and interference may cause some individual time frames of the original signal to be distorted, or to be missing altogether. If a given frame can only appear following one of a small subset of the possible frames, its appearance following a frame which is not a member of that subset indicates that either the subject frame or its predecessor (or both) has been distorted from some original frame which was appropriate to the context. The parameters of each individual frame may be 'permitted', (i.e. the parameters fall within the expected ranges), but a sequence of parameters, considered together, may be invalid, indicating that distortion is taking place. The parameters stored in the store 4 define a network definition function which includes such effects. The parameters generated by the vocal tract analysis are fed as input to the neural network 5, which applies a network definition function to the data generated by the vocal tract analysis, to produce an output 6. The network definition function is defined by parameters stored in the store 4, to derive classification of the quality of the signal supplied to the source 2.

In order to include parameters relating to time-dependent properties, e.g. to identify not only whether the instantaneous characteristics of the output from the model are within the capabilities of the human vocal tract, but also whether the time-variant properties are also within such capabilities, the output from the vocal tract analysis is stored in a buffer store 7. A predetermined number of the the stored parameters can be fed as an input to the neural network 5 as "historical" data in addition to the current sample, thereby measuring the time-dependent characteristics of the signal. The stored parameters may relate to events both before and after the current sample, to allow both "pre-history" and "post-history" of the sample to be taken into account. Obviously, in the latter case, analysis of the current sample cannot take place until its post-history has been assembled.

The source 2 may be connected to many individual telecommunications links sequentially, in order to monitor the signal quality of a large number of links. Although particularly suited for non-intrusive measurement processes, the invention is also usable in so-called "intrusive" measurements, in which a test signal is used as the source rather than a live one.

The output 6 may be displayed in any suitable form to a user. For example a source generating a classification representing poor performance may be indicated to a network manager so that the telecommunications link represented by the source 2 can be taken out of service and repaired if necessary, the link being re-established by another routing if possible. In one possible arrangement, such action may be controlled automatically, or it may be left to a human controller to act on the indications supplied by the output 6.

The parameters recorded for each time frame may be stored as a short code, representing the parameters. This takes up less memory, and can also shorten processing time considerably. The sequence of codes of successive time frames should, like the parameters they represent, follow one of a number of recognised sequences corresponding to real speech sounds. Should a set of parameters be identified for a time frame which have a code which should not follow the previous members of the sequence, or which is not coded for at all, this indicates that a distortion is present.

In order to generate the parameters stored in the store 4, the neural network 5 must first be trained to establish the network definition function, using training data. This process is illustrated in FIG. 1. Test data is supplied from a training apparatus 1 to the vocal tract analyser 3. The training apparatus 1 also supplies classification parameters relating to the test data to the neural network 5 to allow the generation of the labels for defining the network definition function to be stored in the store 4.

The generation of these labels will now be described. In order to generate the volume of data required in order to train a neural net, using speech segments which are too short to be individually assessed accurately by a human operator, an automatic method of generating such signals has been devised. This process relies on the use of a perceptual analysis model, that is a process which assesses whether a distortion of a signal is significant to a human listener. Initially a source of test signals 8 is provided which has two associated stores (8a,8b). The first store 8a has a "good"

signal sample. The complete sample is typically of length of several hours. The second store 8b has a corresponding version of the same sample, which has been subjected to distortion, by means which will be described later. The sample stored in the second store 8b includes varying degrees and types of distortion. The distorted signal is divided into short segments (typically 20 milliseconds) which are fed directly to the vocal tract analyser 3 (FIG. 1). The analysis unit 9 compares the "good" sample with the distorted sample and generates a sequence of labels representing the degree to which the distortion present in each segment is deemed by the model to be perceptible to a human listener. This analysis process will be described in general terms here, but the analysis techniques used in published International Patent Applications numbers WO94/00922, WO95/01011, and WO95/15035 are particularly suited.

The analysis system is shown in more detail in FIG. 4. The "good" sample and corresponding distorted sample are fed respectively through inputs 11 and 12 to an auditory model 13, 14. These are shown for clarity as being separate models, but it will be appreciated that the samples may be passed alternately through the same model. It is in any case important that the same process is applied to both signals. The model generates a number of parameters which relates to the perceptual importance of the characteristics of individual signal segments. The process may involve separating the sample into various overlapping spectral bands, using overlapping filters to model the phenomenon of simultaneous masking, in which a sound masks a quieter simultaneous sound which is close to it in frequency, and may also involve comparing each segment with one or more previous or subsequent segments to model the phenomenon of temporal masking, in which a quiet sound immediately preceding or following a louder sound is less perceptible than if the louder sound is not present. As described in the aforementioned patent specifications, the auditory model process generates an auditory surface, and the two auditory surfaces corresponding to the "good" sample and the distorted sample are then compared in a comparator 15 to produce an error surface. These surfaces are essentially a measure over a number of time segments and frequency or pitch bands (the individual ranges of the bands having been selected to be of equal perceptual significance, e.g. by conforming the signal to the Bark scale) in which the perceived magnitude of the sound signal is represented on an axis perpendicular to both the pitch and time axes. Different weightings may be applied to positive and negative values, for example to account for the differences in impairment which result from signal loss as compared to added noise. If no distortion is present at all, the error surface will have a value of zero over the entire surface. If, as in the example to be discussed, the values on the error surface are determined as the absolute magnitude of the difference (possibly weighted as described) between auditory model outputs, all values of the error surface are positive.

As described in the aforementioned patent applications, the characteristics of the error surface can be used to derive a value for the perceptual importance of the errors carried thereon. As described in particular in international patent application WO95/15035, the absolute magnitude of the error aggregated over the error surface is a factor in this value. However a contribution can also be made by a value which is dependent on the shape of the surface, described in that specification as the "error entropy".

A final weighted value for "listening effort", $Y_{LE}$, which gives an indication of the absolute amount of distortion present, can be derived as follows:

$$\text{Error Activity, } E_A = 10\log \sum_{i=1}^{48} \sum_{j=1}^{20} |c(i, j)|$$

where c(i,j) is the error value in the $i^{th}$ time segment and $j^{th}$ pitch band of the error surface to be analyzed.

The distribution of the error over time and pitch (or rather, the entropy of the distortion, which corresponds to the reciprocal of the extent to which the energy is distributed) is calculated as follows:

$$\text{Error entropy, } E_E = -\sum_{i=1}^{48} \sum_{j=1}^{20} a(i, j) \cdot \ln(a(i, j))$$

$$\text{where } a(i, j) = \frac{|c(i, j)|}{E_A}$$

The natural logarithm (ln) term in the above expression controls the extent to which the variation in the amplitude of the energy affects the entropy $E_E$, acting as a non-linear compression function.

It is found that the error activity and error entropy criteria together correspond well to the subjectively perceived level of distortion, as the listener will find a high level of error considerably more noticeable if it is concentrated at a single pitch over a short period of time, rather than being distributed over pitch and time.

The error entropy $E_E$ gives a measure of the distribution of the error which is independent of the magnitude of the total amount of error, whereas the error activity $E_A$ gives a measure of the amount of error which is independent of its distribution.

In fact, to take account of the logarithmic units of the audible error amplitude scale employed in this embodiment, it is convenient to recast $E_A$ and $E_E$ as $E'_A$ and $E'_E$, as follows:

$$E'_A = \sum_{i=1}^{n} \sum_{j=1}^{m} 10^{|c(i,j)|}$$

and $$E'_E = -\sum_{i=1}^{n} \sum_{j=1}^{m} \frac{10^{|c(i,j)|}}{E'_A} \cdot \ln\left(\frac{10^{|c(i,j)|}}{E'_A}\right)$$

The error activity and error entropy measures can then be combined to give a good indication of what the subjective listener response to distortion would be, in a manner which is relatively robust to the actual nature of the distortion.

We have found that a good indication of the subjective "listening effort" measurement $Y_{LE}$ is given by $$Y_{LE} = -a_1 + a_2 \log_{10} E'_A + a_3 E'_E$$

where $a_1 = 8.373$; $a_2 = 0.05388$; and $a_3 = 0.4090$.

Suitable threshold values for $Y_{LE}$ can be used to determine whether a particular sample should be labelled as "well conditioned" or "ill conditioned". The label generator 17 performs the above calculations and outputs to neural net 5 the labels appropriate to the corresponding test signal segments produced by the temporal segmenter 10 from the signals extracted from the store 8b.

The source of distorted and "good" signals used in store 8 may be supplied from a pre-generated store. Various corpora of suitable data are already available, but further data may be readily generated. The generation of such data is relatively straightforward and is illustrated in FIG. 5.

An initial test signal, which may comprise several samples of real speech, using different talkers in order to ensure a representative selection, is fed to the "good" store 8a. The same signal is also fed through a distortion generator 19. The resulting distorted signal is stored in the "distorted" signal store 8b. Various different sources of distortion may be applied. By using various permutations of different test signals and distortion types a large and representative corpus of test data can be generated to serve as training data to be supplied by the training data source 1.

Typical forms of distortion are supplied to the test signal by the distortion generator 19 in order to supply a representative selection of such signals to the training process. These distortions can be generated to simulate various effects. They may be generated algorithmically (i.e. by mathematical manipulation of the samples, for example to emulate a prototype system) or by passing the original signal through real apparatus, either in a test facility or in a real system such as a telecommunications network.

The labels supplied by the training apparatus 1 to the neural network 5 will inform the network of the nature of the training signal being transmitted, and therefore enable it to apply appropriate weightings to the various parameters stored in the store 4 in respect of data having these characteristics. Examples of different types of distorted and undistorted signals are supplied by the training apparatus 1, so that the output 6 may identify not only that a perceptible distortion is present, but also the extent of impairment caused by the distortion, that is, how disturbing its presence is to the listener.

In order to ensure that the network definition is accurate, test data for which a classification is known in advance may be supplied at input 2, the classification generated by the network definition function in the neural network 5 then being compared (by means not shown) with the known classification.

We claim:

1. A non-intrusive method of assessing the quality of a first signal carrying speech, said method comprising the steps of:

analyzing said signal carrying speech to generate output parameters according to a spectral representation imperfect vocal tract model capable of generating coefficients that can parametrically represent both speech and distortion signal elements, and weighting the output parameters according to a network definition function to generate an output derived from the weighted output parameters, the network definition function being generated using a trainable process, using well conditioned and/or ill-conditioned samples of a test signal, modeled by imperfect the vocal tract model.

2. A method as in claim 1, wherein:
the network definition function is established by means of the following steps:
providing a training sequence comprising a first signal and a distorted version of the first signal; and
determining the network definition function by measuring the perceptual degree of distortion present in each segment, as determined by an analysis process in which a distortion perception measure is generated which indicates the extent to which the distortion of said signal will be perceptible to a human listener.

3. A method as in claim 2 in which the analysis process:
estimates the effect which would be produced on the human auditory system by distorted and undistorted versions of the same signal,
determines the differences between the said effects, and
generates said distortion perception measure in dependence upon said difference.

4. A method as in claim 2, in which:
the analysis process generates said distortion perception measure to depend (a) upon perceptual intensity of said distortion, and (b) nonlinearly upon the amplitude of said distortion.

5. A method as in claim 2, in which:
said analysis process estimates the effect which said distortion would produce on the human auditory system taking into account the temporal persistence of said effect.

6. A method as in claim 2, in which the analysis process:
decomposes the distorted signal into a plurality of spectral component bands, the spectral component bands being shaped to provide spectral masking;
calculates the temporal masking of the signal due to preceding and/or succeeding temporal portions thereof;
forms, for each of the spectral component signals, a representation of the difference between the component signal of the distorted signal and a correspondingly calculated component of the test signal; and
generates said distortion perception measure from said difference representation.

7. A method as in claim 2, in which:
the analysis process estimates, for each spectral component signal, the masking effect which that spectral component signal would produce on the human auditory system.

8. A method as in claim 6 in which:
the analysis process generates a measure of the spectral and temporal distribution of the distortion from said difference signal.

9. A method as in claim 1 in which:
the network definition function weightings are dependent on the temporal context of the output parameters.

10. A method as in claim 9, wherein:
sequences of parameters are classified with weighting values derived from a control set of parameter sequences.

11. A method as in claim 10, wherein:
the parameters identified for each member of the sequence are stored in shortened form, and weighted according to a labelled set of sequences also stored in shortened form.

12. A method as in claim 1 wherein the spectral representation is an imperfect vocal tract model.

13. Apparatus for non-intrusively assessing the quality of a first signal carrying speech, said apparatus comprising:

means for analysing said first signal carrying speech using a spectral representation imperfect vocal tract model capable of generating coefficients that can parametrically represent both speech and distortion signal elements to generate output parameters, storage means for storing a set of weightings defining a network definition function, means for generating an output value derived from the output parameters and the network definition function; and training means for generating the stored set of weightings, the training means comprising means for supplying a sample of speech to the analysis means; and means for generating weightings relating to the speech sample, and inserting them in the storage means.

14. Apparatus as in claim 13, the training means comprising:

means for providing a training sequence comprising a first signal and a distorted version of the first signal, analysis means for receiving the training sequence and generating a distortion perception measure for indicating the extent to which the distortion would be perceptible to a human listener, and means for applying the distortion perception measure to the trainable processing apparatus to determine the network definition function.

15. Apparatus as in claim 14, in which the analysis means comprises:

measurement means for estimating the effect which would be produced on the human auditory system by distorted and undistorted versions of the same signal, means for determining the differences between the said effects, and means for generating said distortion perception measure in dependence upon said difference.

16. Apparatus as in claim 15, in which the analysis means comprises:

measurement means for decomposing the distorted signal into a plurality of spectral component bands, the spectral component bands being shaped to provide spectral masking, means for calculating the temporal masking of the signal due to preceding and/or succeeding temporal portions thereof;

means for forming, for each of the spectral component signals, a representation of the difference between the component signal of the distorted signal and a correspondingly calculated component of the test signal; and calculation means for generating said distortion perception measure from said difference representation.

17. Apparatus as in claim 16, in which:

the measurement means estimates, for each spectral component signal, the masking effect which that spectral component signal would produce on the human auditory system.

18. Apparatus as in claim 16 in which:

the calculation means generates a measure of the spectral and temporal distribution of the distortion from said difference signal.

19. Apparatus as in claim 14 in which:

the analysis means generates a distortion perception measure whose value is dependant (a) upon perceptual intensity of said distortion, and (b) nonlinearly upon the amplitude of said distortion.

20. Apparatus as in claim 14, in which the analysis means includes:

measurement means for estimating the effect which said distortion would produce on the human auditory system taking into account the temporal persistence of said effect.

21. Apparatus as in claim 20, which the analysis means comprises:

measurement means for generating a time sequence of successive processed signal segments from said test signal and/or said distorted signal, the value of at least some signal segments being generated in dependence upon portions of said test signal and/or distorted signal which precede and/or succeed said signal segments.

22. Apparatus as in claim 13 in which the weightings defining the network definition function are dependant on the temporal context of the output parameters, and comprising:

means for storing output parameters relating to a plurality of temporal instants, the means for generating an output value being arranged to derive the output value from the stored output parameters and the network definition function.

23. Apparatus as in claim 22, comprising:

means for storing a sequence of the output parameters as they are generated; and means for generating an output from said sequence in accordance with a set of predetermined weightings for such sequences.

24. Apparatus as in claim 23, comprising:

means for storing the parameters of the sequences in shortened form.

25. Apparatus as in claim 13 wherein the spectral representation is an imperfect vocal tract model.

* * * * *